United States Patent

Cochran

[15] 3,701,844

[45] Oct. 31, 1972

[54] COLOR COMPENSATING NETWORK FOR AN INTEGRATED CIRCUIT TELEVISION RECEIVER

[72] Inventor: Larry Allen Cochran, Indianapolis, Ind.

[73] Assignee: RCA Corporation

[22] Filed: Jan. 4, 1971

[21] Appl. No.: 103,714

[52] U.S. Cl.....178/5.4 HE, 178/5.4 CK, 178/5.4 MC

[51] Int. Cl.............................H04n 9/48, H04n 9/46

[58] Field of Search.........178/5.4 HE, 5.4 AC, 5.4 R

[56] References Cited

UNITED STATES PATENTS 3,597,639 8/1971 Harwood...................307/262

*Primary Examiner*—Robert L. Richardson
*Assistant Examiner*—John C. Martin
*Attorney*—Eugene M. Whitacre

[57] ABSTRACT

The present invention describes a color compensating network which is coupled to available terminals on such circuit devices to improve the reproduction of flesh tones in the presence of spurious phase errors of the color signal burst relative to the color sub-carrier. A reduction in Q channel gain to improve flesh tone reproduction follows from the described attenuation of blue color difference signals, together with the shifting of the blue and red chroma demodulation axes. Flesh tone reproduction when phase errors are present is further improved by shifting the temperature of the cathode-ray kinescope during color transmission through a lowering of the bias on appropriate control gun electrodes.

8 Claims, 6 Drawing Figures

INVENTOR.
Larry A. Cochran
BY
Charles Brodsky
ATTORNEY

INVENTOR.
Larry A. Cochran
BY
Charles [signature]
ATTORNEY

INVENTOR.
Larry A. Cochran
BY
Charles Brodsky
ATTORNEY

INVENTOR.
Larry A. Cochran
BY
Charles Brodsky
ATTORNEY

COLOR COMPENSATING NETWORK FOR AN INTEGRATED CIRCUIT TELEVISION RECEIVER

BACKGROUND OF THE INVENTION

1. Field of the Invention

This invention relates to color television receivers and, more particularly, to a modification of the color compensating network described in my pending U.S. Pat. application Ser. No. 20,311, filed Mar. 17, 1970, now U.S. Pat. No. 3,617,621, and assigned to the same assignee as this instant case.

2. Description of the Prior Art

That patent describes the existence of phase errors in the propagation path between the television transmitter and the cathode-ray kinescope of a color receiver which give rise to incorrect reproduction of flesh tones. The U.S. Pat. No. 3,617,621 also describes the improvement which can be obtained in flesh tone reproduction first, by reducing the Q channel gain of the receiver and second, by shifting the temperature of the kinescope during color transmissions through the lowering of the bias on appropriate control gun electrodes. In particular, Q channel gain reduction was effected by selectively attenuating the output signal of the B-Y color demodulator, and by phase shifting the reference carrier oscillator signal applied to the R-Y and B-Y demodulators. Color temperature shifting, on the other hand, was effected by coupling negative pulses into the control grid circuitry of the tri-color kinescope to decrease, for example, the bias voltage applied to the control grid of that kinescope gun used in reproducing blue images.

While the operation of the color compensating network described in such afore-mentioned U.S. Pat. No. 3,617,621 has performed quite satisfactorily, it was expected that modifications of the specific circuitry would be necessary to similarly improve flesh tone reproduction in a receiver design utilizing integrated circuit devices in the color processing channels. As is well appreciated in the art, such integrated chips offer the highly desirable features of low cost and stabilized operation in the presence of temperature and power supply changes, but offer the somewhat undesirable feature at the present time of having a limited number of terminals available about the periphery thereof to which connections—including those from color compensating networks—can be made. Illustrative of such chips are those disclosed in pending U.S. Pat. application Ser. Nos. 822,951 and 884,227, respectively filed May 8, 1969, and Dec. 11, 1969, now U.S. Pat. Nos. 3,604,842 and 3,597,639 respectively, each being also assigned to the same assignee at this case. The disclosures of these two latter noted patents are to be incorporated herein by reference, but for present purposes, it will be sufficient to point out that the chroma processing chip of the former case develops a color reference oscillator signal at one output terminal which can be applied to an input terminal of the color demodulator chip of the latter case, to demodulate such chrominance signals as are provided at other input terminals thereof. Color difference output signals, in turn developed by the integrated device of U.S. Pat. No. 3,597,639 may then be coupled to appropriate input terminals of a suitable matrix and driver amplifier component for the electrodes of the cathode-ray kinescope—such as is described in the also pending U.S. Pat. application, Ser. No. 37,780, filed May 15, 1970, now U.S. Pat. No. 3,619,488, and assigned to the same assignee as the previously noted applications. As described therein, the color difference signals are combined with similarly applied luminance signal information to provide those color signals utilized in driving the kinescope to reproduce the transmitted image in full color. Effective utilization of the color compensating technique disclosed in my pending Ser. No. 20,311 application (U.S. Pat. No. 3,617,621) thus involves the connection of various circuitry following its teachings to those terminals presently available on the chroma processing, color demodulator, and kinescope drive components of such available and described apparatus.

SUMMARY OF THE INVENTION

As will become clear hereinafter, the color compensating network of the present invention incorporates additional modules for connection to available chroma processing, color demodulator and kinescope drive structure terminals to effect the described flesh tone improvement. In particular, a double pole, double throw switch is employed which, in one position (where color transmission appears incorrect and improvement of flesh tone reproduction seems desirable) serves to insert module circuitry to attenuate the B-Y color difference signal coupled to the kinescope matrix and drive amplifier and, at the same time, serves to resistively shunt the tint control potentiometer to shift the R-Y and B-Y demodulation axes and to also load the B-Y reference carrier so as to shift the B-Y demodulation axis an additional amount. In the second position of the switch (where transmission appears proper and propagation path disturbances are minimal), on the other hand, these module circuits are removed to enable receiver operation to follow in its conventional manner. Such latter switch position also inhibits the generation of a negative pulse for application into the kinescope drive circuitry, which otherwise would occur during color transmissions when the double-pole switch is thrown to its flesh tone correction mode of operation. As will be seen below, such added modules utilize a first terminal to couple to the chroma processing chip of the Ser. No. 822,951 application (U.S. Pat. No. 3,604,842), second and third terminals to couple to the color demodulator chip of the Ser. No. 884,227 case U.S. Pat. No. (3,597,639) and fourth through sixth terminals to couple to the matrix and drive amplifier device of the Ser. No. 37,780 case (U.S. Pat. No. 3,619,488).

BRIEF DESCRIPTION OF THE DRAWING

These and other advantages of the instant invention will be apparent from a consideration of the following detailed description taken in connection with the accompanying drawings in which.

DETAILED DESCRIPTION OF THE INVENTION

Figure 1:
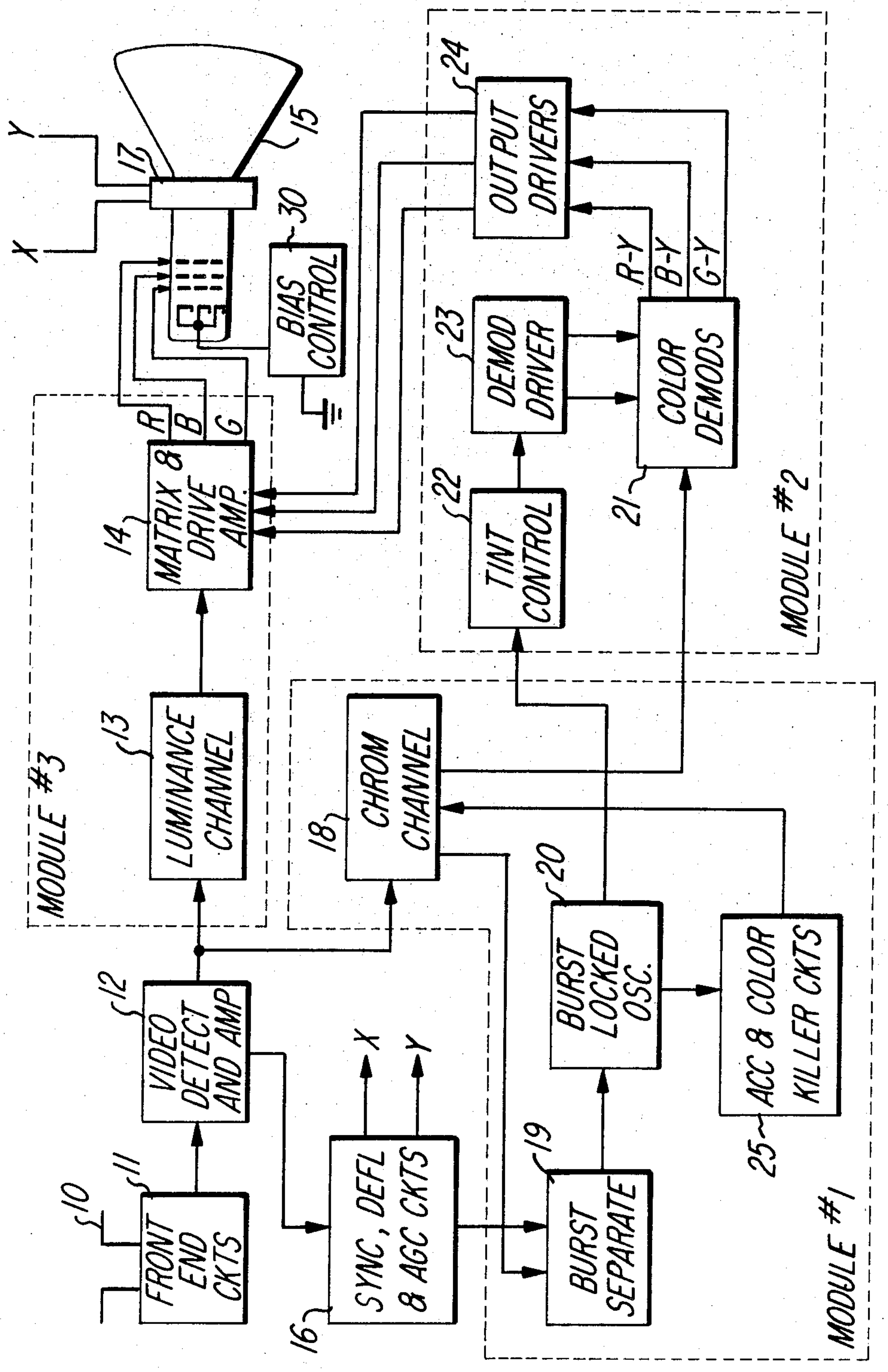
FIG. 1 is a block diagram of a color television receiver employing modular construction in which the present invention is particularly useful.

In FIG. 1, a television antenna 10 is pictorially represented as receiving radio frequency signal transmissions in the television band and coupling such signals to front end apparatus 11 which conventionally selects and processes the incoming signals to provide one in the intermediate band of frequencies. Such intermediate frequency signals are then translated by the video detector and amplifier apparatus 12 into video signal luminance and synchronization information, amongst others.

The derived video signal is shown as being applied to a luminance channel 13 having an output coupled to a kinescope matrix and drive amplifier 14 adapted to energize a tri-color cathode-ray tube 15 in accordance with brightness and chrominance information contained in the incoming signal. Video signals from the detector and amplifier apparatus 12 are also applied to a synchronization, deflection and automatic gain control unit 16 to provide a stable raster scan across the face of the kinescope 15 by providing synchronized vertical and horizontal waveforms X, Y for application to a deflection coil 17 operative in conjunction with the tube 15. The video signal provided by the detection and amplifier circuitry 12 is additionally applied to a chrominance channel 18 incorporating an amplifier stage for processing and amplifying the higher frequency components of the composite signal. As is readily understood, such higher frequency components contain the chrominance sidebands which are transmitted with the composite signal during color transmission. In particular, one output signal is developed by the chrominance channel 18 for coupling to a burst separator 19, whose function is to provide an amplified version of the oscillatory burst signal transmitted along with the composite signal during color transmission, and which provides such amplified signal when a gate pulse generated by the deflection circuits 16 is applied to the separator 19 in time synchronism with the horizontal retrace interval at the time such burst signal occurs. As indicated, the output of the burst separator 19 is applied to an input of a reference signal oscillator 20 which, when synchronized or locked to the burst in this manner, provides an output signal to reliably demodulate the chrominance subcarrier components which are transmitted with the composite signal and which are representative of the color contents of the transmitted scene. As shown in the drawing, SUCH REFERENCE OSCILLATOR output signal is applied to the input of a tint control circuit 22 whose function will be outlined below.

In general, however, the output of the oscillator 20 and the output of the chrominance channel 18 are applied to suitable demodulator circuits in the receiver where they are combined to provide color difference signals or color signals representative of the colors transmitted by the broadcasting station. Thus, the output signal from the channel 18 is coupled to an input of the color demodulator block 21 for combination with the reference oscillator signal coupled through the tint control 22 and through suitable demodulator driver amplifiers 23, as shown. Thus, while the tint control circuit 22 functions to alter the phase of the burst locked oscillator signal to provide the viewer a means for adjusting the relative hue of the reproduced picture, the color demodulators of block 21 function to demodulate the chrominance sub-carrier frequency components transmitted with the composite signal to provide at the output terminals thereof, the conventional R-Y, B-Y and G-Y color difference signals. These signals are applied to the kine driver and matrix amplifier apparatus 14 via an output driver amplifier unit 24 for subsequent application to the appropriate electrodes of the kinescope 15 to reproduce the transmitted image in full color. More specifically, the kinescope matrix and drive amplifier 14 provides at its output terminals the red, blue and green color signals which, when applied to the control grid electrodes of the kinescope 15, produce the desired color picture. As shown, the cathode electrodes of the kinescope 15 are returned to a bias control network 30 which serves to maintain those electrodes at a suitable operating potential with respect to the quiescent voltage applied to the control grids of the kinescope. Also coupled to the reference signal oscillator 20 is an automatic chroma control and color killer unit 25 arranged in part to disable the chrominance channel 18 in the absence of a synchronizing color burst, as during monochrome transmission.

As indicated by the dotted lines of FIG. 1, many of the functional apparatus there shown can be constructed in a modular configuration. Thus, the tint control unit 22, demodulator driver amplifier 23, color demodulators 21 and output drivers 24 have been constructed as a monolithic integrated circuit chip performing the color demodulator function described in the Ser. No. 884,227 U.S. Pat. application, entitled "PHASE SHAFT CIRCUITS, now U.S. Pat. No. 3,597,639." In like manner, the chrominance channel 18, burst separator 19, locked oscillator 20 and ACC and color killer circuit 25 have been fabricated as a monolithic chip in the manner described in the Ser. No. 822,951 application, entitled "AUTOMATIC CHROMA CONTROL CIRCUITS, now U.S. Pat. No. 3,604,842." The luminance channel 13 and matrix and drive circuit 14 have similarly been modularized in the manner disclosed in the Ser. No. 37,780 pending case, entitled "VIDEO AMPLIFIER, now U.S. Pat. No. 3,619,488." The disclosures of each of these applications are, as previously mentioned, to be incorporated herein by reference.

Figure 2:
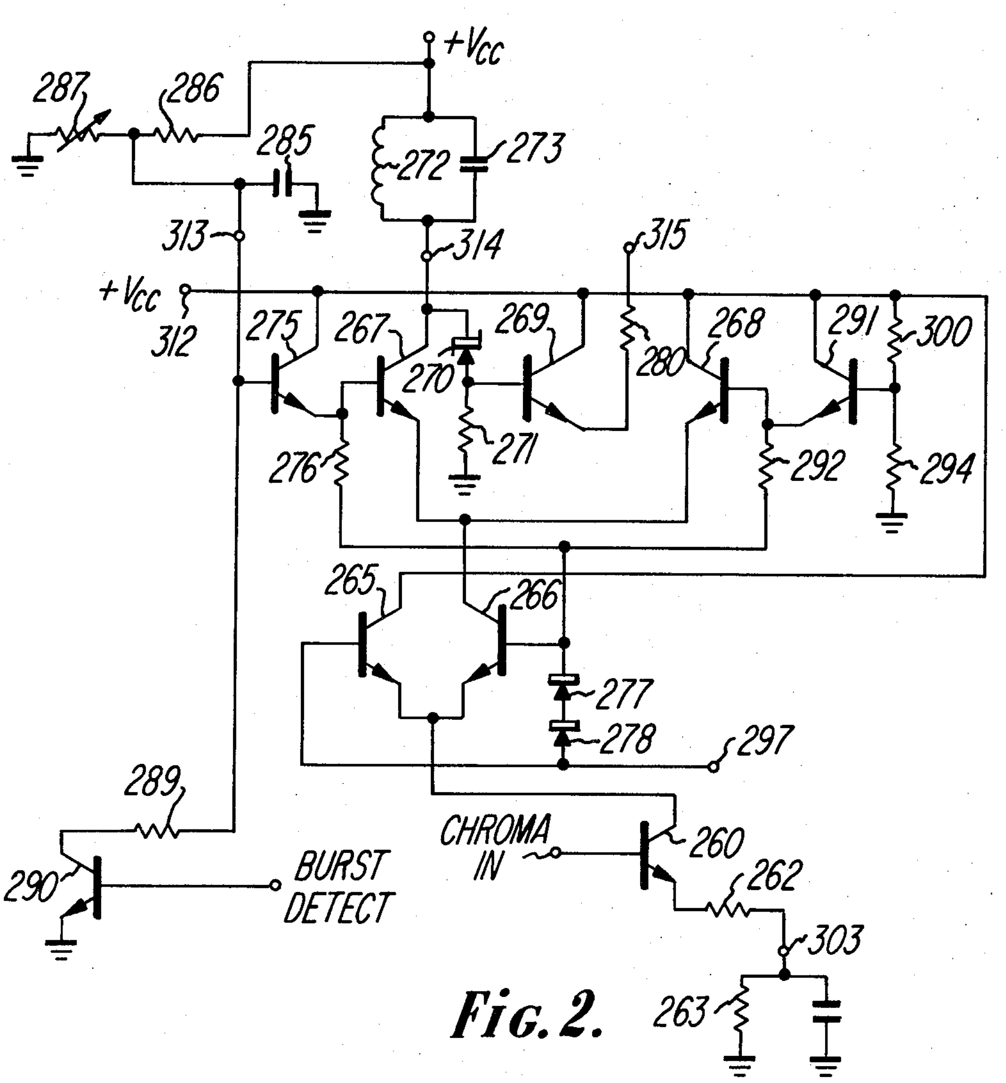
FIGS. 2–4 are schematic representations of portions of the modular constructions of FIG. 1, as detailed in various ones of the pending applications previously noted.
Figure 4:
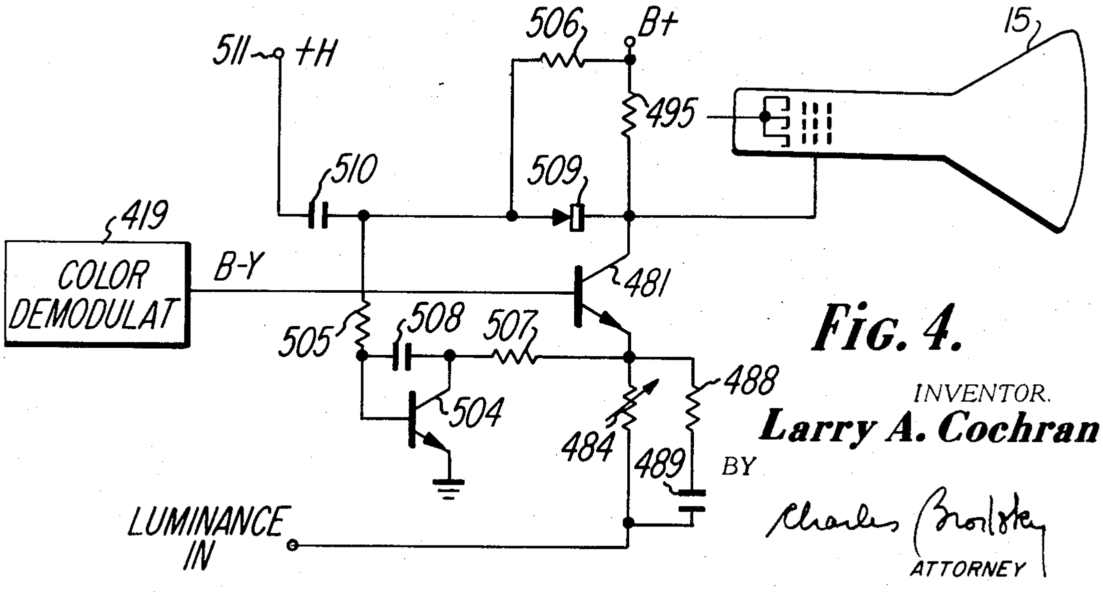
Figure 3:
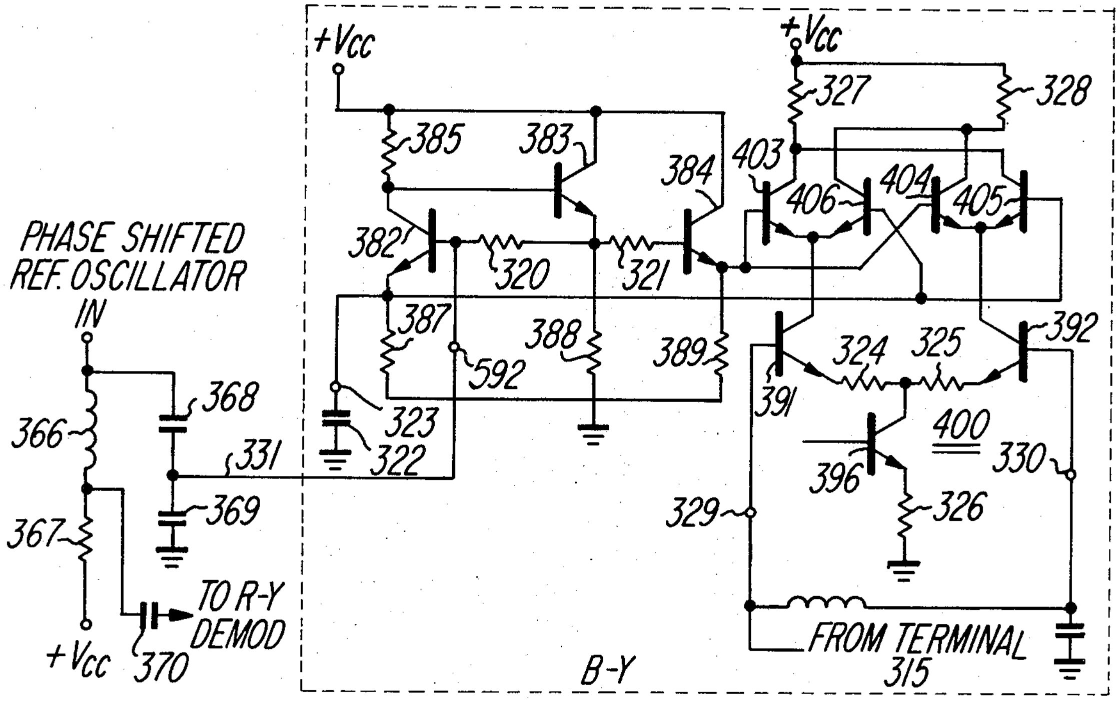

In order to make the description of the present invention more understandable, however, FIGS. 2–4 of this application essentially reproduce portions of the modules schematically shown in each of the cases noted immediately above. Thus, the arrangement of FIG. 2 illustrates portions of the chroma processing module of the Ser. No. 822,951 application, now U.S. Pat. No. 3,604,842, referred to in FIG. 2 therein as the chroma amplifier 25 and burst separator amplifier 27. As in the schematic FIG. 3 of that specification, the amplifier here includes a pair of transistors 267, 268 (i.e., the reference notation accorded by that drawing, increased by 200) arranged in a differential amplifier configuration, with the collector electrode of transistor 267 being coupled to a source of operating potential $+V_{CC}$ through integrated chip terminal 314 and a parallel resonant circuit comprising an inductor 272 and a capacitor 273. The collector electrode of the transistor 268, on the other hand, is directly connected to an integrated terminal of $+V_{CC}$ potential 312, and a pair of follower transistors 275, 291 serve to bias the transistors 267, 268. In particular, the collector electrodes of these transistors 275, 291 are each directly connected to the $+V_{CC}$ terminal 312 while the corresponding emitter electrodes of these transistors are respectively coupled to the base electrode of transistor 267 and to the base electrode of transistor 268. A pair of resistors 276 and 292 are further included to couple the emitter electrodes of transistors 275 and 291 to the base electrode of an added transistor 266, whereas the emitter electrodes of transistors 267 and 268 are each connected to the collector electrode of that transistor 266.

Transistor 266 forms one portion of a switchable differential stage, the other portion being formed by a transistor 265. As shown, the emitter electrodes of those two transistors are interconected, with the junction so formed being coupled to the collector electrode of a further transistor 260. The base electrodes of these transistors 265, 266, on the other hand, are coupled to a point of switchable reference potential 297, with the base electrode of transistor 265 being coupled directly to the point 297 and with the base electrode of transistor 266 being coupled to the point 297 by way of two serially connected semiconductor rectifiers 277,278. To complete the circuit configuration, the collector electrode of transistor 265 is connected to the $+V_{CC}$ integrated terminal 312 while the emitter electrode of transistor 260 is returned to ground potential via a resistor 262, a chip terminal 303 and a resistor 263. Chrominance signals are applied to the base electrode of transistor 260 for amplification and ultimate coupling to appropriate demodulating circuitry, illustratively represented by the integrated chip terminal 315. Such terminal couples to the emitter electrode of a follower transistor 269 by means of a resistor 280, the base electrode of transistor 269 being coupled to the collector electrode of transistor 267 by a zener diode 270. Lastly, the collector electrode of transistor 269 is coupled to the $+V_{CC}$ terminal 312 while a resistor 271 references the base electrode of transistor 269 to ground.

A further pair of resistors 300 and 294 are also included in the arrangement of FIG. 2, shown as being serially coupled between the $+V_{CC}$ terminal 312 and a point of ground potential. Such resistors serve to bias the base electrode of the follower transistor 291, directly connected to their junction. Similar resistance biasing exists to the base electrode of the follower transistor 275, by means of an additional pair of resistors 286, 287 coupled external to the integrated chip between the source of $+V_{CC}$ potential and ground, with the junction of these two resistors being coupled to the base electrode of transistor 275 by means of an additional terminal on the integrated chip 313. These latter resistors 286, 287 are selected to provide temperature tracking with the voltage divider "on-board" resistors 294, 300 and, in the manner described in the referenced application, provide a further manual saturation control for the applied chrominance signal. Such terminal 313 is further bypassed to ground by an external capacitor 285.

While reference to the Ser. No. 822,951 case (U.S. Pat. No. 3,604,842) illustrates the inclusion of many more elements on the integrated circuit chip than herein considered, it will become clear from the description below that only these elements need be considered to properly understand the present invention. It will be sufficient to note in passing, however, that the apparatus of the present invention essentially couples to terminal 313 of that FIG. 3 device in providing the color temperature shift feature of this invention. To that end, FIG. 2 of this specification also shows the inclusion of a resistor 289 serially coupled between the terminal 313 and the collector electrode of a transistor 290, utilized as a color-killer in the Ser. No. 822,951 case to disable the amplifier path to terminal 315 during a monochrome transmission. During the line interval portion of a color transmission, on the other hand, applied chrominance signals are amplified by transistor 260 and by transistor 266 (enabled by the potential developed at point 297 to disable transistor 265) for application to transistor 267, and from there, through transistor 269 to the output terminal 315. During the burst interval, however, the potential developed at point 297 in the manner described in the Ser. No. 822,951 application switches transistor 265 "on" to switch transistor 266 "off" and disable the chrominance path to terminal 315.

The circuit construction of FIG. 3 corresponds to the demodulator drive apparatus illustrated in pending application Ser. No. 884,227, now U.S. Pat. No. 3,597,639. As associated with B-Y demodulator of that case, the driver includes three transistors 382, 383, 384 (i.e., the reference notation accorded by FIG. 2 therein, increased by 300), with the collector electrode of the latter two transistors being directly connected to the $+V_{CC}$ integrated circuit point of potential (+11.2V) and with the collector electrode of the first transistor being coupled to that point by a resistor 385. The emitter electrodes of each of these transistors are similarly coupled to a point of ground potential by substantially equal valued resistors 387, 388, 389 while the emitter electrode of transistor 383 is correspondingly coupled to the base electrodes of transistors 382 and 384 by substantially equal valued resistors 320, 321. With the collector electrode of transistor 382 directly connected to the base electrode of transistor 383, and with phase shifted oscillator reference signals coupled to the base electrode of transistor 382 via a chip terminal 592, oppositely poled reference signals are provided at the emitter electrodes of transistors 382 and 384 for coupling to opposite sides of a balanced B-Y demodulator. The emitter resistor of transistor 382 is bypassed by a capacitor 322 coupled to the emitter electrode via a terminal 323 such that the circuit comprises both a direct current biasing circuit for the balanced demodulator which follows as well as an alternating current drive circuit.

Such B-Y demodulator 400 includes a pair of transistors 391, 392 arranged as a differential amplifier with a further transistor 396 serving as a constant current source. As shown, the emitter electrodes of transistors 391, 392 are each coupled to the collector electrode of transistor 396 via equal valued resistors 324, 325, while the emitter electrode of that transistor 396 is referenced to ground through a resistor 326. The collector electrode of transistor 391 is, in turn, coupled to the connected emitter electrodes of added transistors 403, 406 which, together with further transistors 404, 405, from a switching transistor network for the differential B-Y demodulator. Thus, the emitter electrodes of transistors 404, 405 are also interconnected with the collector electrode of transistor 392, the collector electrodes of transistors 403 and 405 and of transistors 404 and 406 are interconnected, and the base electrodes of transistors 403 and 404 are cross-coupled, along with similar cross-coupling between the base electrodes of transistors 405 and 406. With the collector electrodes of transistors 403 and 405 coupled together and the $+V_{CC}$ point of energizing potential via a resistor 327, and with similar coupling of the collector electrodes of transistors 404 and 406 via a resistor 328, the demodulator arrangement is substantially complete. As indicated, one polarity of reference oscillator signal is coupled to the base electrodes of transistors 402 and 404 from the emitter electrode of demodulator driver transistor 384, while the opposite polarity of signal is coupled to the base electrodes of transistors 405 and 406 from the emitter electrode of demodulator driver transistor 382. The chrominance signal—such as developable at terminal 315 of the FIG. 2 construction herein—is applied between the base electrodes of transistors 391 and 392 via chip terminals 329, 330.

As with the FIG. 2 arrangement herein described, various other components form a part of the integrated circuit of the Ser. No. 884,227 application, now U.S. Pat. No. 3,597,639, but are considered superfluous towards an understanding of the present invention. As will become clear hereinafter, the arrangement shown in FIG. 3 of the present drawings will be modified somewhat to provide the flesh tone compensation characteristics of the instant invention, while the FIG. 2 arrangement—showing the chroma processing circuitry of the invention—will be employed essentially intact. As indicated in FIG. 3, the phase shift network for the reference oscillator signals coupled to transistor 382 includes a pair of capacitors 368, 369 serially coupled between the oscillator source and ground. A similar phase shift network for the R-Y demodulator (not shown) includes an inductor 366 and resistor 367 serially coupled between the oscillator source and the potential $+V_{CC}$. A lead 331 effects the coupling to the B-Y demodulator by connecting to the junction of capacitors 368, 369 while a capacitor 370 effects the coupling to the R-Y demodulator by coupling to the junction of inductor 366 with resistor 367.

The kinescope matrix and drive module shown in FIG. 4 is, as was previously mentioned, of the type described in pending U.S. application Ser. No. 37,780, now U.S. Pat. No. 3,619,488. In general, the arrangement incorporates a pair of transistors 481, 504 (i.e., the reference notation accorded by the single drawing thereof increased by 400), with the collector electrode of transistor 481 being coupled to an energizing potential source B+ through a resistor 495 and with the emitter electrode of transistor 504 being directly coupled to ground. The base electrode of transistor 481 is, as indicated, coupled to an output of the color demodulator 419 at which the B-Y color difference signal is developed while the emitter electrode of transistor 481 is coupled to a point at which the amplified luminance signal is supplied, by means of a resistor 484. Such luminance signal also includes the positive retrace blanking pulses, both horizontal and vertical, as described in the above noted patent application. The base electrode of transistor 504 is also coupled to the B+ operating source through bias resistors 505 and 506 connected in series, while the collector electrode of transistor 504 is coupled to the emitter electrode of transistor 481 via a resistor 507. A capacitor 508 is also coupled between the base and collector electrodes of transistor 504 to form, with the internal capacitance existent between such electrodes, a large effective capacitance due to the multiplication obtained by the Miller effect during conduction of transistor 504 to act as a bypass capacitor for all alternating signals developed at the electrodes of that transistor. A resistor 488 and a capacitor 489 are further serially coupled across resistor 484 to provide video peaking for the higher frequency components of the matrixed signals while resistor 484 is shown variable to control the relative gain of the circuit. Lastly, the junction between resistors 505 and 506 is coupled to the collector electrode of transistor 481 via a semiconductor rectifier 509, having its anode electrode coupled to the junction.

As indicated in the drawing, the collector electrode of transistor 481 is directly coupled to the control grid of the tri-color kinescope 15 to apply thereto a signal corresponding to both the color difference input signal and the luminance input signal in the manner described in such application. Thus, with a capacitor 510 included to couple positive pulses obtainable at a module terminal 511 to the junction of rectifier 509 and resistor 505, transistor 481 matrixes the chrominance signal coupled to its base electrode with the luminance signal coupled to its emitter electrode to provide the color signal applied to the control grid of the picture tube 15. Transistor 504 and its associated components comprise a bias circuit in the described manner to stabilize the operation of transistor 481 in the presence of low-level input signals. As with the arrangements shown in FIGS. 2 and 3 herein, many other components form a part of the module described in such Ser. No. 37,780 application (U.S. Pat. No. 3,619,488), but a further description thereof is considered to be unnecessary to properly understand the workings of the present invention, now to be described.

Figure 5:
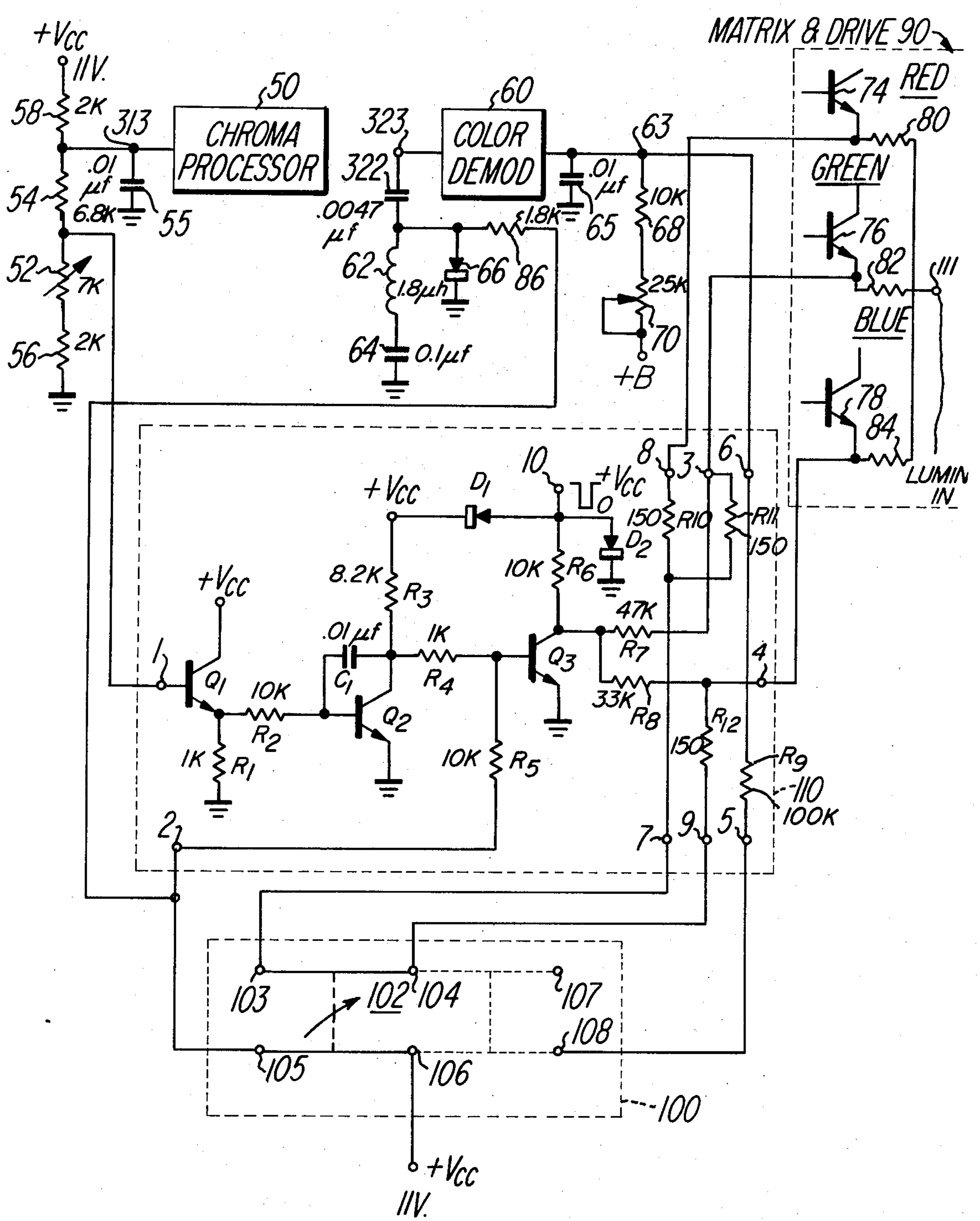
FIG. 5 is a schematic diagram, partly in block form, of the color compensating network of the present invention as utilized in combination with these aforenoted modular configurations.

The configuration of FIG. 5 illustrates one embodiment of the present invention for carrying out flesh tone correction in a receiver employing modular components as might appear as in FIGS. 2–4. Thus, block 50 in FIG. 5 may represent the chroma processing chip described in the 822,951 application, now U.S. Pat. No. 3,604,842 (FIG. 2, herein) with the input terminal 313 thereof being modified for connection to a different manual gain control arrangement—namely, one in which a control potentiometer 52 (similar to variable resistor 287 of FIG. 2) is connected between a pair of resistors 54, 56, with resistor 54 being in turn coupled to input terminal 313 of the processing module 50 and to the $+V_{CC}$ energizing point by way of a resistor 58. As with FIG. 2, the terminal 313 is bypassed to ground, by a capacitor 55. Similarly, the color demodulator unit 60 of FIG. 5 may represent the chroma demodulator of FIG. 3 herein, with the modification, however, that capacitor 322, instead of being coupled from a terminal 323 to a point of ground potential, is coupled from terminal 323 to ground through an inductor 62 and a capacitor 64 connected in series. The junction between capacitor 322 and inductor 62 is additionally coupled to ground by means of a semiconductor rectifier 66, having its anode coupled to the specified junction and its cathode electrode coupled to ground.

The tint control resistor for the color demodulator 60 is also modified somewhat from that disclosed in the Ser. No. 884,227 case, now U.S. Pat. No. 3,597,639 by inserting a resistor 68 between the tint control resistor 70 and a chip terminal 63, bypassed to ground by a capacitor 65. As described in that application, the tint control resistor 70 effected a current division in a differential amplifier stage to cause a phase angle change in the reference oscillator signal applied to the phase shift network, including capacitors 368 and 369 and to the network including inductor 366 and resistor 367 (FIG. 3).

Figure 3A:
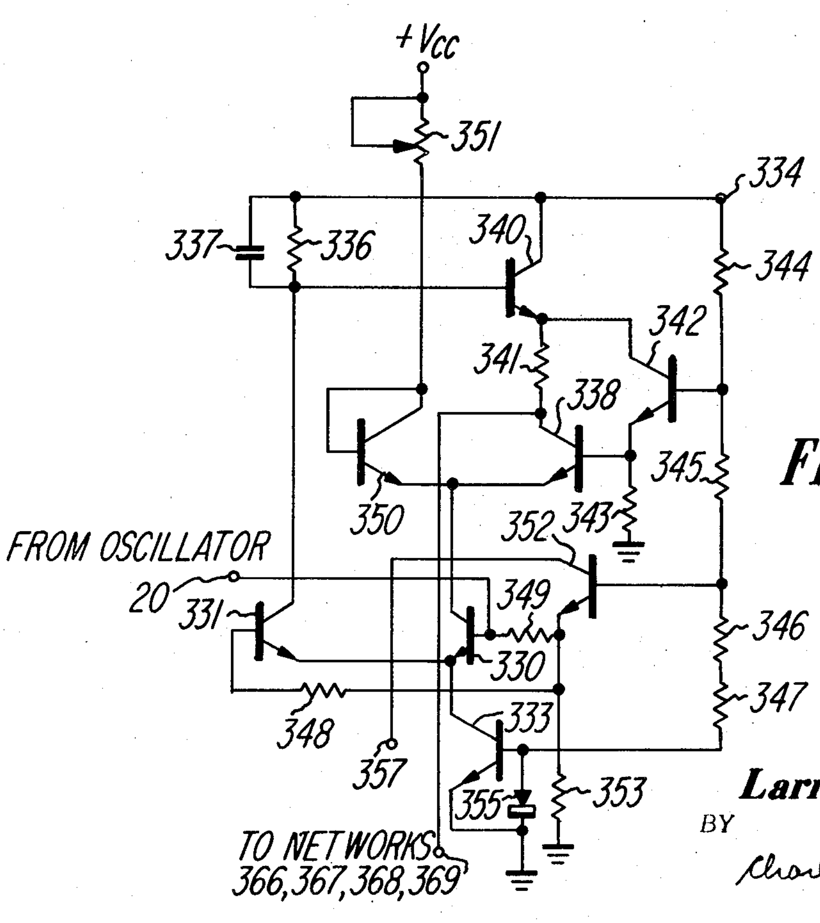

In particular, such tint control apparatus—as illustrated in FIG. 3*a*—includes a pair of transistors 330, 331 arranged as a differential amplifier and having interconnected emitter electrodes which are coupled to the collector electrode of an included constant current source transistor 333. Resistors 334–347 are serially coupled between the integrated circuit point of $+V_{CC}$ potential 334 and the base electrode of transistor 333 to provide the operating bias needed when the emitter electrode of that transistor is grounded, as shown. The collector electrode of transistor 331 is coupled to the $+V_{CC}$ terminal 334 via a parallel network including resistor 336 and capacitor 337, which provides a reference phase angle for the tint control circuit. Such circuit includes a variable resistor 351 coupled, at one end, to an external source of $+V_{CC}$ potential and, at the other end, to the connected collector and base electrodes of a temperature tracking and bias stabilizing transistor 350. The emitter electrode of transistor 350 is, in turn, connected to the collector electrode of transistor 330 and to the emitter electrode of a further transistor 338. Proper bias voltage is provided the base electrode of transistor 338 by a connection to the emitter electrode of an additional transistor 342, being referenced to ground by means of a resistor 343 and having a base electrode connected to the junction of resistors 344, 345. The collector electrode of transistor 342 is similarly returned to the collector electrode of transistor 338 via a resistor 341 and, also, to the emitter electrode of a follower transistor 340, having a collector electrode connected to the $+V_{CC}$ chip terminal 334 and a base electrode connected to the collector electrode of transistor 331. Bias voltage is applied to the base electrodes of transistors 330, 331 by means of substantially equal valued resistors 348, 349, coupled to the emitter electrode of another included transistor 352, having a base electrode coupled to the junction of resistors 345 and 346 and an emitter electrode coupled to ground by a resistor 353. Lastly, a semiconductor rectifier 355 is coupled across the base-emitter junction of transistor 333—to establish its current bias while providing overall temperature stability—while the collector electrode of transistor 352 is coupled to a point of positive potential 357 approximating the valve of the $+V_{CC}$ source.

As described in application Ser. No. 884,227 (U.S. Pat. No. 3,597,639), the reference signal from the burst locked oscillator (reference notation 20 in FIG. 1 herein) is coupled to the base electrode of transistor 330 and appears phase shifted at the collector electrode of transistor 338 by an amount dependent upon the division of collector current from transistor 330. This, in turn, is dependent upon the setting of resistor 351 which determines the proportion of that current which flows through transistor 350. As a capacitor 354 is included to couple the collector electrode of transistor 350 to ground, such setting is primarily a D-C control as the a-c signal currents are bypassed. After further processing by a differential limiter stage (not shown), the phase shifted oscillator signals from transistor 338 are supplied to the networks 366, 367 and 368, 369 to obtain the necessary 90° phase difference between the reference signals coupled to the R-Y and B-Y demodulators. As is well known, the demodulation axes of these units depend upon the phase of the reference signal supplied to effect the synchronous detection. By changing the setting of resistor 351, therefore, demodulation on different axis is possible, to vary the hue of a reproduced color image.

In like manner, transistors 74, 76 and 78 in FIG. 5 correspond to the mixer transistors 480, 482, 481 of the matrix and drive module of the Ser. No. 37,780 application—with resistors 80, 82, 84 of FIG. 5 corresponding to the variable resistors 483, 485, and 484 shown therein, noting in passing that resistors 483 and 485 function as gain control units for the transistors 480 and 482 in the same manner as resistor 484 provides gain control for transistor 481 as described with respect to FIG. 4 herein. As indicated, transistors 74, 76, and 78 are commonly coupled to a terminal 111 to receive the amplified luminance signal.

In accordance with the present invention, the arrangement of FIG. 5 includes two additional modules. The first, or switch module 100 includes a double pole-double throw ganged switch 102, which in one position—its normal position—connects switch terminals 103, 104, and terminals 105, 106. As shown, terminal 106 is coupled to the same source of $+V_{CC}$ potential as is employed with the other modular devices noted. In its second positon—that used when an improvement in flesh tone reproduction is desired—, switch 102 connects terminal 104, 107, and 106, 108. As indicated in the drawing, terminal 107 does not connect to any circuit component of the arrangement, whereas each of the other terminals 103–106 and 108 connect to components which play a part in achieving the flesh tone improvement.

The second, or color compensating module 110 includes three transistors $Q_1$, $Q_2$ and $Q_3$, a pair of semiconductor rectifiers $D_1$, $D_2$, and a plurality of other resistive and capacitive components. As shown, the base electrode of transistor $Q_1$ is coupled through an input terminal 1 to the chroma processing unit 50—and, namely, to the junction of the color potentiometer control 52 with the resistor 54—while the collector electrode of transistor $Q_1$ is directly connected to the $+V_{CC}$ energizing potential. A first resistor $R_1$ couples the emitter electrode of transistor $Q_1$ to ground whereas a second resistor $R_2$ couples that emitter electrode to the base electrode of transistor $Q_2$. A first capacitor $C_1$ is connected between the collector and base electrodes of transistor $Q_2$ and a further resistor $R_3$ couples the collector electrode of transistor $Q_2$ to the $+V_{CC}$ energizing potential. The emitter electrode of transistor $Q_2$ is connected to ground potential, as is the corresponding emitter electrode of the transistor $Q_3$. The base electrode of transistor $Q_3$ is shown coupled to the collector electrode of transistor $Q_2$ by an additional resistor $R_4$ and to an input terminal 2 by means of a resistor $R_5$. The collector electrode of transistor $Q_3$ is, in turn, coupled by a resistor $R_6$ to a source of negative going pulses at a point 10, and to an output terminal 3 by means of a resistor $R_7$ and to an output terminal 4 by means of a resistor $R_8$. Semiconductor rectifier $D_1$ is shown coupled between the pulse source 10 and the $+V_{CC}$ point of potential, with the anode of the rectifier $D_1$ being coupled to the pulse source. At the same time, the second semiconductor rectifier $D_2$ is included, with its anode electrode coupled to the pulse source point 10 and its cathode electrode coupled to ground. Such rectifiers thus limit the excursions of the supplied negative pulses to $+V_{CC}$ volts and ground, respectively. As will be seen from the drawing, input terminal 2 on the color compensating module 110 is shown directly connected to terminal 105 of the switch mode 100 and, by way of resistor 86, to the junction of rectifier 66 and inductor 62 associated with the color demodulator 60.

Also shown in the color compensating module 110 of FIG. 5 are four additional resistors. One end of the first of these resistors $R_9$ is coupled via an input terminal 5 to terminal 108 of the switch module 100, while the other end of resistor $R_9$ is coupled via an output terminal 6 to terminal 63 of the color demodulator 60. One end of the second of these resistors $R_{10}$ is similarly coupled via input terminal 7 to terminal 103 of the module 100, while the other end of resistor $R_{10}$ is coupled to output terminal 8. In like manner, the third resistor $R_{11}$ is coupled between input terminal 7 and output terminal 3, whereas one end of the fourth resistor $R_{12}$ is coupled via input terminal 9 to terminal 104 of the switch module 100 and its other end is coupled to output terminal 4. As further shown, output terminal 8 of the color compensating module 110 is coupled to the emitter electrode of mixer transistor 74 of the matrix and drive amplifier unit 90, output terminal 3 is coupled to the emitter electrode of mixer transistor 76 and output terminal 4 is coupled to the emitter electrode of mixer transistor 78. Such arrangement symbolically concludes the drive circuit for the red, green and blue kinescope guns for the matrix configuration.

As has previously been mentioned, the present invention, as depicted in FIG. 5, operates in a manner similar to that described in my application Ser. No. 20,311 U.S. Pat. No. 3,617,621, to improve flesh tone reproduction by reducing the gain of the Q channel of the television receiver and by shifting the color temperature of the kinescope. Thus, in accordance with the teachings described therein, the present invention operates to improve flesh tone reproduction by reducing Q channel gain through the attenuation of the output of the B-Y demodulator, through the shifting of the phase of the reference carrier applied to the R-Y demodulator, and through the further shifting of the phase of the carrier applied to the B-Y color demodulator. Similarly, color temperature shifting of the tricolor kinescope is effected by changing the bias voltage applied to the appropriate blue gun electrodes of the picture tube.

Consider, first, the operation of the invention by means of which the Q channel gain reduction is achieved. Which switch 102 of the module 100 in the position shown in the drawing, it will be seen, that the potential at terminal 106 of the module 100 forward biases the rectifier 66 coupled to the color demodulator unit 60, thereby grounding capacitor 322 as in FIG. 3. At the same time, it will be seen that switch terminal 108 is disconnected from a complete circuit loop so that resistor $R_9$ connected thereto and across the tint control resistor 70 is similarly out of the circuit. However, each of the resistors $R_{10}$, $R_{11}$, and $R_{12}$ are effectively connected together in a Y configuration via switch terminals 103, 104 and module terminals 7, 9, so that when these three resistors are selected to equal resistance value, substantially equal gain is exhibited by each of the driver transistors 74, 76, 78 coupling to the kinescope control grids for comparable values of resistors 80, 82, 84. Such switch position as shown thus corresponds to that used when color transmission is proper and minimal propagation errors are present. But, when the switch 102 is moved to the position shown by the dotted lines in the drawing to improve flesh tone rendition, it will be seen that only resistors $R_{10}$, $R_{11}$ of the three resistors $R_{10}$ – $R_{12}$ are in the circuit—via module terminal 7—to shunt the emitter networks of drive transistors 74, 76. Since resistor $R_{12}$ is associated with the blue drive transistor 78, this switch position provides the attenuation for the B-Y signal applied to the base electrode of transistor 78, needed as the first element in effecting the reduction in Q channel gain. Resistor $R_{12}$ is connected to terminal 104 as before, but its resulting disconnection from resistors $R_{10}$, $R_{11}$ serves to lower the gain of transistor 78 more than the amount by which the rearrangement of those two resistors lowers the gain of transistors 74, 76.

At the same time, movement of switch 102 to the position shown by dotted lines connects resistor $R_9$ across the tint control resistor 70, so as to effect a further split in current in a differential amplifier stage, of the demodulator 60 in the manner described in the noted Ser. No. 884,227 case with respect to resistor 351 of FIG. 3*a*. As such current division determines the phase angle of the reference carrier signal used in the demodulation process, the inclusion of resistor $R_9$ across the potentiometer 70 effects a phase shift of the reference carrier signal. It will be understood that this shift changes the demodulation axis of the R-Y color demodulator and, also, the demodulation axis of the B-Y demodulator. Also, the $+V_{CC}$ potential previously applied to the rectifier 66 at the B-Y demodulator is removed by the switching of unit 102, so that capacitor 322 becomes additionally loaded by the series combination of inductor 62 and capacitor 64. This causes a further phase shift of the carrier signal as applied to the B-Y demodulator, and produces a further change in the demodulation axis of the B-Y demodulator. This is in accordance with the mathematical expressions shown in my Ser. No. 20,311 application, where it is indicated that the shift in the B-Y vector is to exceed the corresponding shift in the R-Y vector to give the necessary Q channel gain reduction. Thus, the change to the dotted-line position of the switch 102 in the arrangement of FIG. 5 is analagous to a corresponding change in the position of switch 80 in my previously referred to application, and effects the Q channel gain reduction needed to improve flesh tone reproduction.

Consider, now the operation of the invention by means of which the change in color temperature of the kinescope is achieved. It will be seen that when the switch 102 is in its solid line or normal position, the $+V_{CC}$ potential at module terminal 105 is applied to the base electrode of transistor $Q_3$ through resistor $R_5$. This positive voltage is selected of a value sufficient to saturate transistor $Q_3$ (when of the NPN polarity type shown). The relatively low potential developed at the collector electrode of transistor $Q_3$ under such condition is coupled to the emitter electrodes of the matrix transistors 76 and 78 through resistors $R_7$ and $R_8$, and from thence through their respective collector electrodes to the control grids of the green and blue cathode-ray kinescope guns to effect substantially little change on the operating points there established by the bias control network 30 (FIG. 1). Any negative going pulse supplied at point 10 is coupled to ground through the saturated transistor $Q_3$, and similarly produces little change in the kinescope operating point. However, when the switch 102 is changed to its dotted line position, such $+V_{CC}$ potential is removed from the resistor $R_5$, which then becomes disconnected from the circuit. The potential which will be developed at the control grid electrodes of the green and blue kinescope guns will then depend on the threshold setting of the saturation control potentiometer 52 coupled to terminal 1 of the color compensating module 110 and on the presence or absence of a color transmission.

In particular—and when a monochrome transmission is present—, the color killer transistor 290 of FIG. 2 is rendered conductive in the manner described in the Ser. No. 822,951 application. This effectively shunts the series combination of resistors 52, 54 and 56 at the chroma processing block 50 with the resistor 289 of FIG. 2. Such connection serves to reduce the voltage present at input terminal 1 of the color compensating module 100 which, with the values shown and with an 11.2 volt $+V_{CC}$ potential, causes the voltage applied to terminal 1 to be variable as a function of potentiometer 52 between the limits 0.35 to 1.3 volts. Under such conditions, the voltage developed at the base electrode of transistor $Q_2$ will not be sufficient to render transistor $Q_2$ conductive. Transistor $Q_3$ will, however, be conductive in response to the voltage developed at the collector electrode of transistor $Q_2$, to thereby shunt the negative-going pulse from source point 10 to ground. Thus, the voltage coupled to the emitter electrodes of matrix transistors 76 and 78 will be the same as for the case where the switch 102 is in its solid line or normal position, such that no shift in cathode-ray bias will occur.

When a color transmission occurs, on the other hand, the color killer transistor 290 is rendered non-conductive so that the shunting of resistors 52, 54, 56 by resistor 289 is removed. The range of control of the potentiometer 52 for the values shown in this example causes the voltage applied to terminal 1 to vary from 0.7 to 2.6 volts. As the potentiometer 52 is thus varied, a point will be reached at which the potential at terminal 1 of the color compensating module 110 will be 1.4 volts. Beyond such threshold value, transistor $Q_1$ becomes conductive and saturates transistor $Q_2$. Transistor $Q_3$ will, in turn, be rendered non-conductive, to permit the negative pulse supplied at the source point 10 to be coupled by way of resistor $R_7$ to the emitter electrode of the matrix transistor 76 and by way of resistor $R_8$ to the emitter electrode of the matrix transistor 78. Such pulse is then coupled without phase inversion to the control grids of the associated green and blue kinescope guns to reduce their overall operating potentials and lower the bias in the direction needed to change the color temperature of the receiver. As described in my Ser. No. 20,311 application, such change in color temperature of the blue gun is employed to augment the Q channel gain reduction and further improve the flesh tone reproduction of the color image. Additional improvement is had, in accordance with the present construction, by also changing the color temperature of the green gun, but by a lesser amount. In this respect, it will be understood that transistor $Q_1$ is employed in the arrangement of FIG. 5 to remove the dependency of transistor $Q_2$ on the forward current gain of the transistors employed. Capacitor $C_1$ coupled between the collector and base electrodes of transistor $Q_2$ serves to filter any signal picked up on the base electrode connection of transistor $Q_1$ during operation of the receiver.

While there has been described what is considered to be a preferred embodiment of the present invention, it will be evident that other modifications—such as changing transistor and rectifier polarities as well as coupling the matrix and drive transistors to the kinescope cathodes instead of to their control grids—may be made by those skilled in the art. It is therefore contemplated that the appended claims be read in the true spirit and scope of the teachings disclosed herein. Thus, it will be seen that the described embodiment attains flesh tone improvements in an integrated color receiver at least as good as those had in discrete circuit receivers, where de-tuning of transformers was employed to obtain the phase shifts needed for Q channel gain reductions. With the present invention, similar phase shifts are achieved—but in an environment where transformers are sought to be eliminated, as shown, to keep manufacturing costs down.

What is claimed is:

1. In a color television receiver of the type providing improvements of flesh tone rendition through a reduction of Q channel signal gain by shifting the phase of the reference oscillator signal applied to a first color demodulator of said receiver by an amount greater than the phase shift imparted to the reference oscillator signal applied to an included second color demodulator and by further selectively attenuating at least the demodulated output signal of said first demodulator when synchronously applied with chrominance signals representative of the flesh tones to be reproduced, and wherein the apparatus for performing said phase shift function comprises:

differential amplifier means responsive to said reference oscillator signal for imparting a selectively operable, predetermined phase shift thereto prior to application of said oscillator signal to each of said color demodulators, wherein the amount of said phase shift is a function of a direct current supplied to a control terminal of said differential amplifier means, and wherein said amplifier means includes a variable impedance network coupled between a first point of reference potential and said control terminal, a first fixed impedance network and switch means for selectively interconnecting said fixed and variable impedance networks;

and phase shift means responsive to said switch means in the input circuit of said first color demodulator for receiving said predetermined phase shifted oscillator signal and or further shifting the phase of said signal to vary the demodulation axis of said first demodulator to which said further shifted signal is coupled relative to the demodulation axis of said second demodulator.

2. The arrangement of claim 1 for use in a color television receiver also including a plurality of amplifier circuits coupling the output signals from said color demodulators to an additionally included kinescope, and wherein the apparatus for performing said selective attenuation function comprises a second, fixed impedance network switched out of the input circuit of at least that amplifier coupling the output signals from said first demodulator to said kinescope responsive to said switch means.

3. The circuit arrangement of claim 2, wherein there is further included apparatus for selectively shifting the color temperature of said kinescope comprising:

a source of pulse signals and a control circuit coupling path including a third, fixed impedance network switchable in conjunction with said source for coupling pulse signals therefrom of predetermined polarity to an input electrode of at least that amplifier circuit coupling the output signal from said first demodulator to said kinescope to alter the bias on appropriate electrodes of said kinescope to reduce its operating point responsive to said switch means.

4. The circuit arrangement of claim 3, wherein there is also included apparatus for inhibiting said phase shift, said selective attenuation and said selective color temperature shifting operations during a monochrome transmission, comprising:

means for disabling operation of said color demodulators in the presence of said monochrome transmission and for additionally disabling said control circuit coupling path to preclude the coupling of said pulse signals to alter said kinescope bias.

5. The circuit arrangement of claim 4 wherein said first and second color demodulators synchronously detect applied chrominance signals along the B-Y axis and R-Y axis, respectively, when said second, fixed impedance network is switched out of the input circuit of that amplifier coupling the output signal from said B-Y demodulator to said kinescope responsive to said switch means, and wherein said control circuit coupling path including said third, fixed impedance network is switchable in conjunction with said source for coupling said pulse signals to an input electrode of that amplifier coupling the output signal from said B-Y demodulator to said kinescope to alter its bias upon said selective operation direction.

6. The circuit arrangement of claim 4 wherein said variable impedance network for said differential amplifier means includes a potentiometer coupled to effect a division of direct current flow within said amplifier and said first, fixed impedance network is switched in parallel with said potentiometer responsive to said switch means to cause a further division of direct current flow within said differential amplifier.

7. The circuit arrangement of claim 6 wherein said phase shift means includes a resonant network coupled across the input circuit coupling path of said B-Y color demodulator and wherein means are included to switch said resonant network in circuit with said coupling path responsive to said switch means.

8. The arrangement of claim 7 wherein the control circuit coupling path of said color temperature shift apparatus includes a bypass circuit for said kinescope biasing pulse signals and wherein said third, fixed impedance network is included to switch said bypass circuit into a non-conductive condition to preclude the conducting of said pulse signals away from said kinescope electrodes responsive to said switch means.

* * * * *